AUTOMATIC PHASE EQUALIZER

Filed Aug. 7, 1957

INVENTOR
J. R. PIERCE
BY H. O. Wright
ATTORNEY

United States Patent Office 2,908,874
Patented Oct. 13, 1959

2,908,874

AUTOMATIC PHASE EQUALIZER

John R. Pierce, Berkeley Heights, N.J., assignor to Bell Telephone Laboratories, Incorporated, New York, N.Y., a corporation of New York Application August 7, 1957, Serial No. 676,776

8 Claims. (Cl. 333—18)

Figures 1, 2, 3:
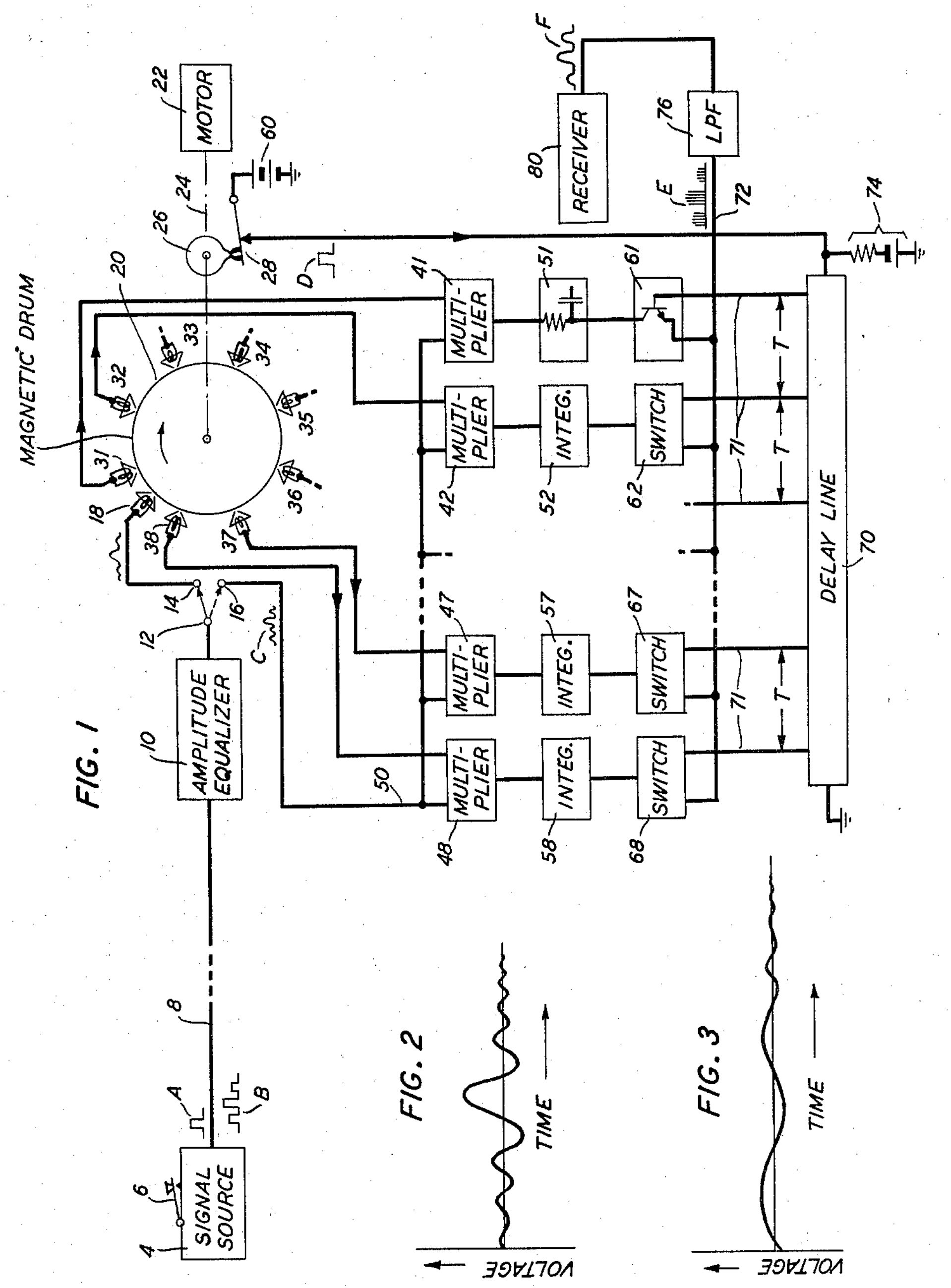

This invention relates to apparatus and methods for equalizing transmission lines which impose distortion upon signals of multiple frequency content.

It has long been known in the art that distorted signals may be corrected by either of two broad types of equalizing structures. The one of these is the passive type structure in which a distorted signal is applied to a network of impedance elements adjusted to eliminate the distortion imposed on the signal by an associated transmission line. The other of these types may be characterized as the active structure in which certain multiplying signals are applied to the received signal in order to compensate for such distortion. Illustrative of this latter class of structures is that described in Patent 2,531,642 to R. K. Potter, granted October 30, 1947.

The many equalizing structures of the prior art have been most successful in achieving their purpose. They are open, however, to the objection that each such apparatus is structurally fixed to effect correction for a particular transmission line under particular environmental conditions of temperature and the like.

It is accordingly an object of the present invention to correct signal distortion imposed by any one of a broad group of transmission lines with a structure quickly, easily and automatically adjustable to a particular line under the varying environments to which this line may be subjected.

It is a further object of the invention to achieve this correction with a minimum of apparatus complexity and with a negligible delay.

These and other objects of the invention are achieved with a structure based on a dual recognition. First, is the fact that amplitude distortions, that is, distortions occasioned by variable attenuation of the different frequency components of a signal, are readily correctible by conventional passive structures. Second, is the fact that phase distortion, or distortion imposed by the unequal velocities with which different frequency components of a signal are propagated by a transmission medium, may be separately corrected by an active filter. In accordance with the invention these recognitions are turned to account by first providing a transmission line having an amplitude transmission characteristic which is adjusted, i.e., amplitude equalized, by well-known means to a preassigned functional relationship with the signal to be transmitted. Secondly, there is provided in accordance with the invention means for storing the phase distorted response of that transmission line to a standard signal of uniform frequency content. Thereafter, the so stored response signal is combined, in accordance with the invention, in multiplying relation with subsequently received signals which have been subjected to the same phase distortion in their transmission over this so amplitude equalized line.

For the purposes of illustration and by way of typical example, it is well to consider signal behavior in a particular type of transmission line having the simplest of amplitude transmission characteristics. Such a simplest illustrative transmission line, for purposes of this consideration, is the transmission line which is band-limited to transmit signal frequencies in a band having an upper limit W and which has a uniform, or flat, amplitude response to signals within this frequency band. Further this simplest illustrative transmission line has a phase delay which is linear with frequency. It is well known in the art that such a transmission line responds to an input pulse signal of unit value and of uniform frequency content with an output signal $E_0$ which is given by the expression $$E_0 = k\frac{\sin \pi Wt}{\pi Wt} \quad (1)$$

where $k$ is an experimental constant, $t$ is time, and other symbols have well-known meanings. This output signal is known as the impulse response of the transmission line since a pulse, or impulse, signal of short duration generates a signal having essentially uniform frequency content up to a frequency related to that signal duration.

If a sampling period T be established such that $$T = \frac{1}{2W} \quad (2)$$

and a second impulse test signal be applied to this transmision line at a time $n$T later than the first signal, where $n$ is an integer, the output response of the transmission line to this second signal will clearly be given by the expression $$E_0 = k\frac{\sin (\pi Wt - n\pi)}{\pi Wt - n\pi} \quad (3)$$

It can be shown that these two output signals, that is, the transmission line impulse response signals, are orthogonal. In other words, the integral of their product over all time is zero.

It may be shown further that two output response signals, derived from an amplitude equalized transmission line having a nonlinear phase versus frequency characteristic, are similarly orthogonal if the applied impulse signals are also spaced apart in time by an integral number $n$ of periods T, as given by Expression 2 above.

Still further, if the two applied impulse signals be coincident in time, that is, if $n=0$ in Expression 3, then the integral product of the two transmission line responses is of a finite value proportional to the amplitudes of the applied signals. Whence, if a succession of pulses spaced apart in time by a period T, as given in Expression 2 above, be applied to a transmission line and thereafter, at the output terminal of the line, be multiplied continuously by the impulse response signal of the line, only that one, or ones, of the applied pulses which appears to be coincident in time with the impulse response signal forms a nonzero product.

In accordance with the well-known Nyquist sampling theorem, any signal limited in bandwidth to a frequency range of ±W may be precisely represented by a series of pulse samples of that signal taken at intervals $$T = \frac{1}{2W}$$

Therefore, any signal to be transmitted may be represented by pulses of the nature of those discussed. The accuracy of this representation, too, is not affected by the phase of the samples. Whence, it follows that any signal, of whatever form, after transmission through a band limited medium is amenable to treatment as though it were a succession of Nyquist sample pulses of a phase convenient to the treatment in question.

In accordance with the present invention structures are provided based upon these analyses and recognitions to turn these principles to account. Thus, structures are provided for automatically storing the response of a transmission line having its amplitude response adjusted or equalized in accordance with a proper preassigned function to a test impulse signal and for thereafter applying plural reproductions of that signal in appropriately time-spaced multiplying relation to each one of the different elements of a phase distorted arrival signal in a fashion to derive single, successive integral product signals each of which is successively representative of a single sample, in accordance with the Nyquist theorem, of the undistorted signal as applied to the transmission line.

The invention will be more fully apprehended from a consideration of the appended claims and the following detailed description of an illustrative embodiment of the invention shown in the accompanying drawings, in which:

Fig. 1 is a schematic drawing of a transmission system compensated for phase distortion in accordance with the invention; and Figs. 2 and 3 are wave forms of assistance in describing the operation of the invention in the embodiment of Fig. 1.

Referring now in detail to the drawings, Fig. 1 shows a source 4 of signals to be transmitted provided with a key 6 or other suitable means for generating a single test impulse signal. This source 4 is connected to the input terminal of transmission line 8 which is band limited to pass signals lying within a given frequency band extending from zero to W frequency. The key 6 is constructed in well-known fashion to provide a test impulse signal of a sharp wave form and short duration illustratively, as shown at A. The sharp wave form of the impulse insures that the impulse contains signal components of all frequencies within the aforementioned frequency passband of the transmission line 8. The short duration of the impulse insures amplitude uniformity among these components. An amplitude equalizer 10 which may be constructed, for example, in accordance with the teachings of H. W. Bode Patent 1,955,788, granted April 24, 1934, is included at the output end of the transmission line to insure that all signals transmitted therethrough are transmitted with an amplitude adjusted in accordance with a preassigned function and preferably in this illustrative embodiment with uniform amplitude attenuation for signal frequencies within the passband of the line.

At the output terminal of the equalizer 10 a double throw switch 12 is connected for directing arrival signals, received through the transmission line, into one of two alternative paths 14 and 16. Through the first of these paths 14 an incoming signal is applied to an electromagnetic transducing head 18 which may be any one of several such well known in the art.

This transducer is mounted in magnetizing relation with the circumference of a drum 20 which has a magnetic recording, cylindrical surface and which is driven at a constant rotational speed by a motor 22 through a shaft 24, shown schematically.

In accordance with the invention this magnetic recording drum is prepared for phase equalizing operation in the following manner: The switch 12 is thrown to the upper, recording position 14. A test pulse signal, as described heretofore, is applied to the transmission line 8 by operation of the key 6. In passing through the line 8 various frequency components of the test signal are propagated at different velocities, that is to say, the line 8 with its amplitude equalizer 10, has a velocity dispersive effect upon signals of different frequencies transmitted thereover.

Passing through the transducing head 18, the test signal is circumferentially recorded on the magnetic drum. The speed of the motor 22 is adjusted so that all significant portions of this magnetically recorded pattern are recorded throughout a time interval corresponding to just one revolution of the drum. The space pattern so recorded on the drum magnetically represents the impulse response of the transmission line 8 with its amplitude equalizer 10.

Were there no velocity dispersion imposed upon the different frequency components of the signal by the amplitude equalized transmission line, the frequency transmission band limitation of the line might distort the impulse signal wave form to one such as is illustratively shown in Fig. 2. This wave form, while not a true representation of the applied signal, is clearly recognizable as a pulse signal as can be seen by inspection of the principal arc of the curve shown in Fig. 2.

The velocity dispersive effects of the transmission line, however, may phase distort the impulse signal so that it is recorded through the transducer 18 as a magnetic space pattern which may, illustratively have the wave form shown in Fig. 3. Inspection of this Fig. 3 and the wave form A demonstrates that phase distortion has rendered the arrival impulse signal completely unrecognizable as an impulse signal.

This wave form of Fig. 3 so recorded, however, magnetically represents the impulse response of the transmission line 8 including the amplitude equalizer 10. This response having been so recorded, the apparatus in accordance with the invention is now conditioned to eliminate phase distortion from subsequently transmitted communication signals, before their application to receiving apparatus 80, by the simple expedient of throwing the switch 12 to the lower conduction position 16.

In addition to the recording transducer, a plurality of reading transducers 31 through 38, inclusive, are equally spaced about the circumference of the magnetic drum at such intervals that, taking the motor speed into account, a given point on the drum circumference passes from one transducer to the next in a time interval T given by the expression $$T=\frac{1}{2W} \qquad (2)$$

where W is the highest frequency transmitted by the transmission line. Each of these reading transducers derives from the magnetic drum a reproduction of the impulse response of the transmission line. By virtue of the reading transducer spacing, each of these several reproductions is correspondingly spaced apart in time at an interval T.

From each of these reading transducers a connection is made to one input terminal of one of a plurality of dual input multipliers 41 through 48 inclusive, respectively, as indicated. These multipliers may be any one of many such devices well known in the art. For example, each of the eight multipliers, associated with the eight reading transducers of this illustrative embodiment may be of the type shown by S. Seely in Electron Tube Circuits, First Edition, published by the McGraw-Hill Book Co., Inc., in 1950, at page 153, Figs. 8–11.

To the second input terminal of each of these plural multipliers a common lead 50 makes connection to the lower switch contact position 16.

From the signal source 4 a communication signal, which may illustratively have a wave form such as that shown at B, is applied to the transmission line, thence, through the switch 12 to each of the multipliers by way of the common input lead 50. Here, phase distortion may illustratively have altered the communication signal such that its wave form is as shown at C.

Upon arrival at the multipliers, the phase distorted communication signal is continuously multiplied with each of the several time-spaced reproductions of the transmission line impulse response recorded on the drum. The resulting plural product signals are then severally and continuously integrated in a like plurality of integrators 51 through 58 inclusive, which may be simple low pass filters such as that indicated for integrator 51 illustratively shown associated with reading transducer 31. These integrators derive a like plurality of product integral signals.

As has been seen, only that product integral signal associated with an arriving communication signal element which coincides in time with the reproduced impulse response signal has a significant value. It has been stated further that a band limited signal may be represented by a series of appropriately spaced samples without regard to the phase of those samples. Hence, for ease of visualization, a single sample, from an illustrative series of eight representing the arrival signal at a particular time period, may be selected in proper phase to coincide with the transmission line impulse response as transduced by a given reading transducer, for example, transducer 31. The remaining seven reproductions of this impulse response signal, hence, are displaced in time by an interval $nT$ from the selected sample signal. Thus, the product integral signals resulting from the multiplication of these seven signals with the impulse response signal derived by the transducer 31 are zero. So it is with each successive sample of the arrival communication signal. Only one multiplier-integrator pair, of the eight indicated in this illustrative embodiment of the invention, derives a nonzero product integral signal from a particular sample in the course of a complete revolution of the magnetic drum.

Thus, at each integrator there is stored a signal proportional to the amplitude of successive elements of the arrival signal. Each of these so stored signals is completely stored at the completion of a full rotation of the drum past a particular reading transducer associated with a storing integrator. Hence, the storing process is completed in each of the several integrators at successive instants of time separated by the interval T as heretofore defined.

To reconstitute these statically stored signals as a useful time varying signal having substantially the same informational content as the communication signal applied to the transmission line, there is provided, in accordance with the invention, means for releasing the stored signals, in proper time sequence, to a utilization apparatus such as the receiver 80. A cam 26, shown schematically, is affixed to the shaft 24 which connects the motor 22 with the magnetic drum 20. Once during each revolution of the shaft this cam operates a contactor 28 to apply a pulse of energy D from a power source, battery 60, to a delay line 70. This delay line has plural taps 71 spaced therealong for deriving signals each spaced apart in time by an interval T. (The same interval T considered several times heretofore.)

These taps are successively connected to the control terminals of a like plurality of signal operated switches 61 through 68 inclusive, which may illustratively be transistor switches such as the switch 61, shown diagrammatically.

Each of these switches has an input terminal connected to an associated one of the integrators and all of the switches have an output terminal connected in common to an output line 72. The switches are respectively biased in the Off condition, that is, in the nonconducting position, by a potential source 74. Upon the arrival of a pulse from the power source 60 through the delay line each of these switches is successively placed in the On or conducting condition. Whence the signals stored in the integrators 51 through 58 inclusive, are successively applied to the output line 72.

Thus, the communication signal B is reconstituted in the output line 72 as a succession of pulses which may have a wave form such as illustrated at E under the assumption that the frequency content of the communication signal B is less than the pass band of the transmission line 8.

This signal illustrated at E may appear to have more informational content than the original communication signal, inasmuch as there is no band limited transmission line interposed between the integrators and the output line. To remove this artificiality, the invention provides a low pass filter 76 serially connected between the output line and the receiver 80. This low pass filter is constructed in accordance with well-known techniques and is designed to pass a frequency consistent with the frequency pass band of the associated transmission line. From the low pass filter, accordingly, there is derived a signal having a wave form such as shown at F, proportional to the original communication signal shown at B, with the spikes shown in wave form E removed and with all phase distortion eliminated.

The invention, it will be apparent to one skilled in the art, is not limited to the specific illustrative embodiment described. Thus, it readily appears that the impulse response of a transmission line need not be stored as a continuous signal on the magnetic drum described. Instead, it may as well be stored as a succession of amplitudes. Similarly, it is obvious that a single reading transducer may replace the plurality of reading transducers described if it is connected to a tapped delay device for deriving a plurality of time-spaced reproductions of the impulse response signal.

Further, consideration has been given primarily to the correction of signals limited by the upper transmission frequency of the transmission line. It is apparent to one skilled in the art that, if the upper frequency content of communication signal is less than the highest frequency propagated by the transmission line, the distortion corrector in accordance with the invention is completely effective though not taxed to its greatest capabilities.

Other and further arrangements and modifications within the spirit and scope of the principles of the invention will readily occur to those skilled in the art. No attempt to exhaustively illustrate all such arrangements and modifications has been made.

Reference is hereby made to a copending application of B. P. Bogert, Serial No. 676,280, filed August 5, 1957. The said Bogert application is assigned to applicant's assignee. It discloses and claims subject matter functionally related to that of the present application.

What is claimed is:

1. A phase equalizer for correcting phase distortion imposed upon communication signals in passage from a signal source to a utilization circuit through an amplitude equalized transmission medium which is limited for signal transmission by an upper frequency, said equalizer comprising means for transmitting through said medium an impulse signal having a uniform frequency content extending upwardly at least to said upper frequency, means for recording the response of said transmission medium to said impulse signal, means for severally applying plural, time-spaced reproductions of said recorded signal in multiplying relation with said distorted communication signals, thereby to derive a plurality of product signals, means for severally integrating said product signals through intervals corresponding to the duration of said spaced signal reproductions, and means for successively applying said integrated product signals to said utilization circuit.

2. A phase equalizer for correcting phase distortion imposed upon communication signals in passage from a signal source to a utilization circuit through an amplitude equalized transmission medium which is limited for signal transmission by an upper frequency, said equalizer comprising means for transmitting an impulse signal through said medium, said impulse signal having a uniform frequency content extending at least to said upper frequency, means for recording the response of said transmission medium to said impulse signal, means for deriving plural reproductions of said recorded signal equally spaced in time at intervals not greater than one-half the period of said upper frequency, means for severally applying said plural reproductions in multiplying relation with communication signals distorted in passage through said medium, thereby to derive a like plurality of product signals, means for severally integrating said product signals throughout like time intervals corresponding to said reproduced response signals, whereby a like plurality of product integral signals are successively derived, and means for successively applying said product integral signals to said utilization circuit.

3. Apparatus as set forth in claim 2 wherein said impulse signal transmitting means comprises means for keying said signal source.

4. Apparatus as set forth in claim 2 wherein said impulse record means comprises a cylindrical magnetic surface.

5. In a system for communication between a source of communication signals and a utilization circuit interconnected through an amplitude equalized transmission medium having a velocity dispersive effect upon signals of different frequencies transmitted therethrough, apparatus for correcting phase distortion introduced by said velocity dispersive medium to communication signals which comprises means for applying an impulse signal to said transmission medium, said impulse signal having a uniform frequency content at least coextensive with the signal frequency transmission characteristic of said medium, means for establishing a record of said impulse signal after transmission through said medium, means interposed between said transmission medium and said utilization circuit for applying plural, time-spaced reproductions of said record signal in multiplying relation with communication signals transmitted through said medium, thereby to form a plurality of product signals, means for severally integrating said plural product signals, and means for applying said severally integrated product signals at successive instants of time to said utilization circuit.

6. In apparatus for correcting distortions imposed upon communication signals in passage through a frequency band limited transmission medium, the combination which comprises means for transmitting through said medium a test signal having a uniform frequency content at least coextensive with the frequency transmission band of said medium, means for establishing a record of said test signal as transmitted through said medium, and means for severally applying time-spaced plural reproductions of said record signal in multiplying relation to communication signals transmitted through said medium, whereby a like plurality of product signals are derived, means for severally integrating said plural product signals over time-spaced intervals corresponding to the duration of said record signals, and means for combining the severally integrated product signals in time sequence.

7. Apparatus as set forth in claim 6 wherein said combining means comprises a utilization circuit and signal operated means for successively applying said integrated product signals to said utilization circuit.

8. A phase equalizer for correcting phase distortion imposed upon communication signals in passage from a communication signal source to a receiver through an amplitude equalized transmission medium which is limited for signal transmission by an upper frequency, said phase equalizer comprising means for establishing a signal record corresponding to the signal response of said transmission medium to an applied impulse signal having a frequency content extending upward to said upper frequency, means for deriving plural reproductions of said response signal, each being spaced in time by a like interval of no greater duration than one-half the period of the upper frequency transmitted by said medium, means for severally applying said reproductions in multiplying relation with communication signals distorted in phase by passage through said medium, thereby to derive a like plurality of product signals, means for severally integrating each of said product signals over time intervals corresponding to different ones of said reproductions, means for successively applying said integrated product signals to said utilization circuit at instants spaced apart in time in correspondence with the spacing of said reproductions, and low pass filter means interposed between said utilization circuit and said product signal applying means for passing signals of frequencies lying below said upper transmission frequency of said medium, whereby said communication signals are reconstituted with phase distortion eliminated.

No references cited.